United States Patent [19]
Ratcliff

[11] 3,795,951
[45] Mar. 12, 1974

[54] GRAB HOOK CONSTRUCTION WITH CLEVIS

[76] Inventor: Ralph A. Ratcliff, P.O. Box 543, Belmont, Calif. 94002

[22] Filed: Aug. 10, 1972

[21] Appl. No.: 279,496

[52] U.S. Cl............................ 24/230.5 CR, 294/82 R
[51] Int. Cl............................ A43c 11/08, B66c 1/36
[58] Field of Search ................ 294/78, 82; 24/230.5

[56] References Cited
UNITED STATES PATENTS
| 831,984 | 9/1906 | Peters .............................. 294/82 R |
| 1,616,013 | 2/1927 | Warren........................ 24/230.5 CR |
| 3,501,817 | 3/1970 | Bambenek et al. ........... 294/82 R X |

FOREIGN PATENTS OR APPLICATIONS
266,149  2/1927  Great Britain.............. 24/230.5 CR Primary Examiner—Donald A. Griffin

[57] ABSTRACT

An improved grab hook construction comprising a hook body having a tip portion at one end thereof and a shank portion at its opposite end. The shank portion is defined by a pair of spaced apertured arms having an apertured boss positioned therebetween and separated therefrom by slots. A clevis member defined by a U-shaped body having spaced apertured legs is pivotally interconnected with the shank portion of the hook body by a pivot pin positioned to extend through aligned openings in the shank portion arms, the boss portion, and the clevis legs when the clevis and hook body are interfitted. A chain link is connected with the clevis body and is precluded from separation therefrom while the clevis and hook body are pivotally interconnected.

4 Claims, 4 Drawing Figures

PATENTED MAR 12 1974  3,795,951

GRAB HOOK CONSTRUCTION WITH CLEVIS

BACKGROUND OF THE INVENTION

1. Field of the Invention

This invention relates to the field of hook constructions. More particularly, this invention relates to the field of grab hooks designed to be releasably engaged with a length of coil chain for securing or sustaining a load carried by such chain. Still more particularly, this invention relates to the field of improved grab hook constructions including improved means for operatively connecting the hook construction with a chain link so that the hook body may be more easily and effectively engaged with or disengaged from a length of chain inserted in the throat opening of the hook.

2. Description of the Prior Art

Heretofore grab hooks of the general type with which this invention is involved have been operatively connected with a chain link by means of a connecting pin which was passed directly through the chain link and through aligned openings in a bifurcated shank portion of the hook body. So far as is known, the utilization of a clevis which is interengaged with a specially designed shank portion of a hook body in the manner disclosed herein has been unknown heretofore.

With such prior art arrangements, it is more difficult to engage a grab hook with a length of coil chain than is true with the improved hook construction of this invention. The subject hook construction may be more easily engaged with a length of coil chain at any suitable location along its length because of the greater pivotability between the hook body and a chain link which is operatively connected with the clevis member.

That is, with the subject hook construction the hook body may be engaged with a chain length by grasping the hook and moving the same into engagement with the length of chain at a selected location. Heretofore, it has been generally necessary to insert the chain length into engagement with the hook body, rather than vice versa as above noted. When the chain is of substantial size and weight, it is easier to manipulate the hook than to attempt to manipulate the chain length to engage the same with the hook. Thus, the subject hook construction, due to its improved structural features, may be more readily engaged with a chain length than can known prior art grab hook constructions.

SUMMARY OF THE INVENTION

This invention relates generally to an improved grab hook construction. More particularly, this invention relates to an improved grab hook construction having improved means for connecting the same operatively with a chain link so that the throat opening of such hook construction may be more easily engaged with a length of chain at a predetermined position along its length.

Still more particularly, this invention relates to an improved grab hook construction defined by a hook body having a hook portion which defines a throat opening and by a clevis body pivotally interconnected with the hook body. Still more particularly, this invention relates to an improved hook construction which includes a clevis member by means of which a chain link is operatively connectable with the hook body in improved pivotal fashion.

The present hook construction includes a novel arrangement by which a clevis member and a hook body member are pivotally interconnected to facilitate and enhance pivotal connection between the hook construction and a chain link operatively connected with the clevis so that a length of chain may be more easily connected with a throat opening formed in the hook body.

From the foregoing, it should be understood that objects of this invention includes the provision of an improved grab hook construction; the provision of an improved grab hook construction defined by a hook body and a pivotally interconnected clevis member; the provision of an improved grab hook construction in combination with a chain link pivotally connected with a clevis member which in turn is pivotally interconnected with a hook body member; and the provision of improved pivotal interconnecting means between a U-shaped clevis member and a hook body member having a shank portion contoured to interfit with the clevis member.

These and other objects of this invention will become apparent from the following description taken in conjunction with the appended drawings.

DESCRIPTION OF THE PREFERRED EMBODIMENT

Figure 1:
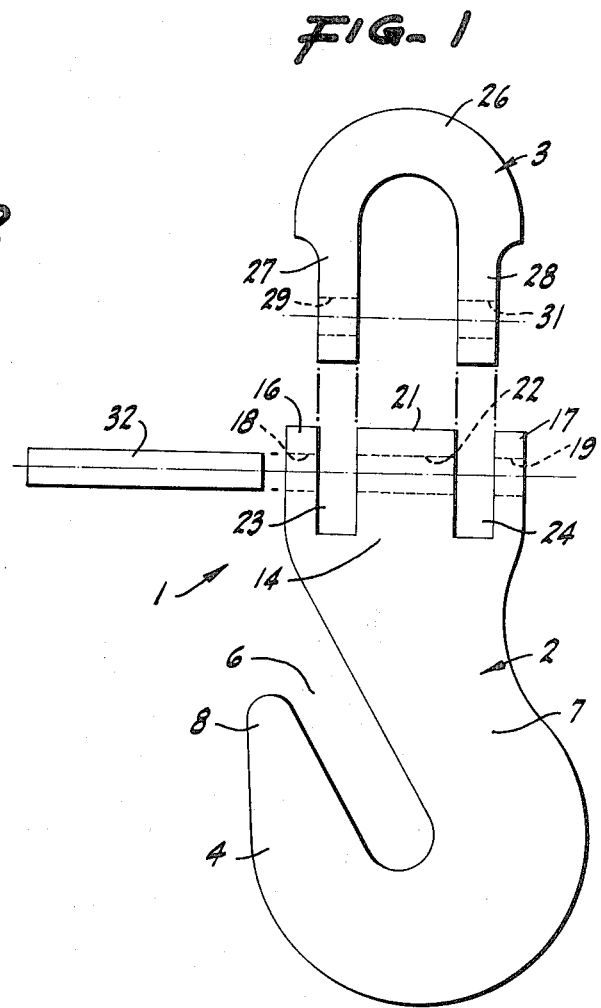
FIG. 1 is a side elevational view of the subject hook construction in disassembled condition illustrating details of construction of the components thereof.

The grab hook construction of this invention comprises two principal components operatively interconnected with each other by a pivot member. In that regard, the hook construction generally designated 1 comprises a hook member 2 and a clevis member 3. The hook member is defined by a hook body contoured generally in accordance with the configuration of known grab hook constructions designed for releasable and selective inner-engagement with a length of coil chain. To that end, the hook body comprises a hook portion 4 at one end of the body which defines a generally narrow throat opening 6 between the central portion 7 of the hook body and the tip 8 thereof.

Figure 2:
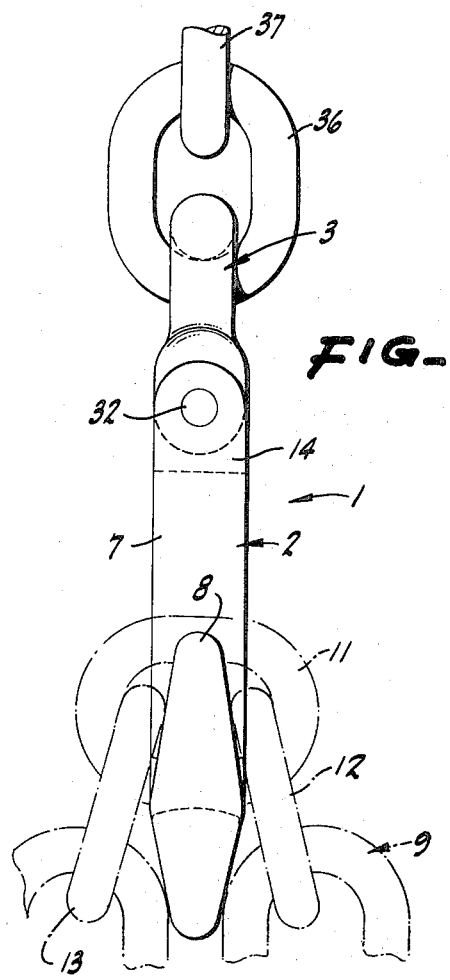
FIG. 2 is a front elevational view of the hook construction of this invention showing the same assembled and operatively connected in combination with a chain link.
Figure 3:
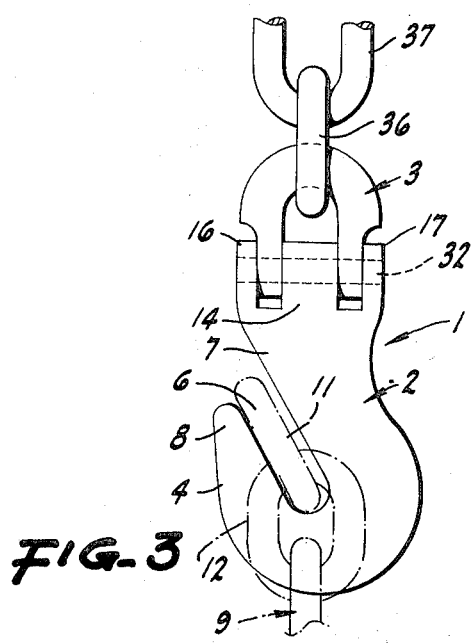
FIG. 3 is a side elevational view of the assembled hook construction-chain combination corresponding to that shown in FIG. 2 but on a slightly smaller scale.

Thus, as seen in FIGS. 2 and 3, a length of coil chain, generally designated 9, may be interengaged releasably and rapidly with the hook body by inserting a preselected link 11 thereof laterally into engagement with the throat opening 6. The links 12 and 13 lying on opposite sides of link 11 and integrally connected therewith preclude separation of the length of chain 9 from the hook in known fashion.

At its other end, the hook body is defined by a shank portion specifically designed to incorporate the novel features of this invention therein. Such shank portion is generally designated 14 and comprises a pair of apertured laterally spaced mounting arms 16 and 17 having openings 18 and 19 respectively extending laterally therethrough. Such openings are axially aligned with each other.

Interposed between the spaced arms 16 and 17 is a boss portion 21 which has an opening 22 extending laterally therethrough, the latter being axially aligned with the openings 18 and 19 in the shank portion arms 16 and 17. Slots 23 and 24 are provided between the spaced arms at opposite ends of the boss so that the boss is separated from such arms by the slots, as best seen in FIG. 1.

The clevis member 3 is defined by a generally U-shaped body 26 which terminates in a pair of parallel laterally spaced apertured legs 27 and 28, having openings 29 and 31 respectively extending therethrough. Such openings are axially aligned with each other.

The legs 27 and 28 of the clevis are provided with opposed planar side surfaces and the lateral dimension of such legs corresponds generally to, but is slightly less than, the lateral dimension of the slots 23 and 24 in the hook shank portion. Thus, as seen from FIGS. 2 and 3, the clevis member may be slidably interfitted into the slots 23 and 24 until the openings 29 and 31 in the clevis legs are aligned with the openings 18 and 19 in the hook arms and the opening 22 in the hook boss.

When thus aligned, a connecting member may be inserted through the aligned openings to positively preclude separation of the clevis from the hook shank portion in the manner seen in FIG. 3. Such connecting member in the embodiment illustrated comprises a pivot pin 32 of known construction. Such pin 32 is generally right circular cylindrical in configuration and the diameter thereof preferably is slightly less than the diameter of the circular openings 18 and 19 in the hook arms 16 and 17 and the openings 29 and 31 in the clevis legs 27 and 28. Thus, the pin may be slidably interfitted axially through the aligned openings 18 and 29 at one side of the hook construction and also through the aligned openings 19 and 31 at the opposite side of the hook construction. Thus, the pin may be inserted from either side of the hook construction.

Preferably the diameter of pin 32 is slightly greater than the diameter of the circular opening 22 passing through the boss 21 of the hook shank portion. Thus, the pin must be force fitted or pressed into the boss opening 22 in known fashion. Thus, when the pivot pin is moved to the operative position shown in FIG. 3, separation of the clevis from the hook body is positively precluded. If desired, the pivot pin 32 may be provided with enlarged splines or projections intermediate its ends to further enhance the press-fit between it and the boss portion of the hook body.

When the pivot pin is in position, as shown in FIG. 3, the clevis 3 and the hook body are free to pivot in all directions about the axis of the pivot pin.

As noted from FIGS. 2 and 3, the clevis of the hook construction is designed to be interfitted in combination with a chain link, designated 36, which in turn forms one link of a length of chain. That is, link 36 is connected with an adjacent link 37 of the length of chain with which the hook construction is to operatively be connected so long as the clevis member and hook member are operatively interconnected. Thus, the hook construction is generally permanently connected with the length of chain defined by links 36 and 37, whereas the hook construction is releasably engageable with the length of chain 9 selectively engaged in the throat opening 6 as described previously.

With the improved hook construction of this invention, engagement of the hook body with the length of chain 9 at any predetermined location along its length is facilitated because of the greater pivotal flexibility between the hook construction and the length of chain defined by chain link 36. That is, with the present arrangement, it is a simple matter to grasp the hook body and to manipulate the same to engage the throat thereof with a predetermined link of chain length 9. Heretofore, it was generally necessary to grasp the length of chain 9 and to engage the chain with the hook, rather than vice versa as above noted.

Figure 4:
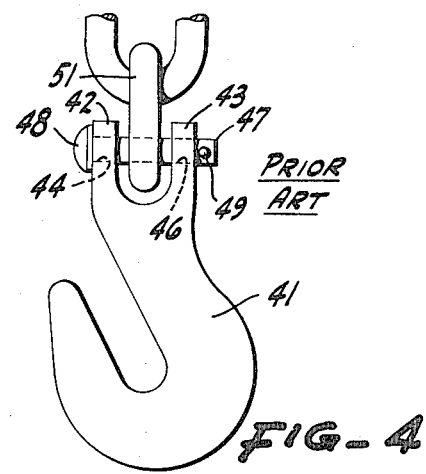
FIG. 4 is a side elevational view of a conventional grab hook construction characteristic of the prior art.

In that connection, referring to FIG. 4, a conventional grab hook designed for engagement with a length of coil chain characteristic of the prior art is shown. Such conventional hook construction comprises a hook body 41 having a bifurcated shank opposite from the throat opening therein. The shank is defined by a pair of spaced arms 42 and 43 which are provided with aligned openings 44 and 46 therethrough. A connecting pin 47 having a head 48 at one end thereof and a cotter pin 49 extending laterally through the other end thereof is provided to define means for interconnecting such conventional hook construction with a chain link 51 as seen in FIG. 4.

With the prior art construction shown in FIG. 4, the manipulative flexibility characteristic of the subject hook construction is absent in that the prior known hook body may be pivoted only in one direction relative to the chain link 51 connected therewith. With the present hook construction, pivotal movement of the hook body in substantially all directions relative to the chain link 36 may be affected because the hook body may pivot relative to the clevis and the clevis in turn may pivot relative to the chain link. Thus, greater pivotal flexibility is provided with the present invention which facilitates engagement of the hook throat with a length of chain 9 as described.

Having thus disclosed a preferred embodiment of this invention and advantages thereof, reference is directed to the appended claims for the scope of protection to be afforded thereto.

I claim:

1. An improved grab hook construction comprising

A. a hook body having
      1. a hook portion defining a throat opening at one end thereof with which a length of chain is releasably engageable, and
      2. a shank portion at its other end comprising spaced mounting arms along a free margin thereof,
      3. a boss portion interposed between said spaced arms and separated therefrom by slots at its opposite ends,
      4. said arms having aligned openings extending laterally therethrough,
      5. said boss portion having an opening extending laterally therethrough in alignment with said openings in said arms,
   B. a clevis member interfitted with said mounting arms of said shank portion defined by 1. a generally U-shaped body which terminates in spaced legs,
2. said legs having aligned openings extending laterally therethrough, C. said clevis being interfitted with said shank portion with said clevis legs received in said slots, and D. a pivot pin extending laterally through said aligned openings in said shank portion arms and boss portion and said clevis legs,
1. said pin interconnecting said clevis and said hook body for free pivotal movement relative to each other.

2. The hook construction of claim 1 in which the size of said pivot pin is less than the size of said openings in said clevis legs so that said clevis is freely pivotal on said pin, and in which the size of said pin is slightly greater than the size of said opening in said boss so that said pin is non-rotatably fitted in said boss opening to prevent inadvertent separation of said pin from said boss.

3. In combination,

A. an improved grab hook construction, and

B. a chain link operatively connected with said hook construction; said hook construction comprising
1. a hook body having
   a. a hook portion defining a throat opening at one end thereof with which a length of chain is releasably engageable, and
   b. a shank portion at its other end comprising spaced mounting arms along a free margin thereof,
   c. a boss portion interposed between said spaced arms and separated therefrom by slots at its opposite ends,
   d. said arms having aligned openings extending laterally therethrough,
   e. said boss portion having an opening extending laterally therethrough in alignment with said openings in said arms,
2. a clevis member interfitted with said mounting arms of said shank portion defined by
   a. a generally U-shaped body which terminates in spaced legs,
   b. said legs having aligned openings extending laterally therethrough,
3. said clevis being interfitted with said shank portion with said clevis legs received in said slots, and
4. a pivot pin extending laterally through said aligned openings in said shank portion arms and boss portion and said clevis legs,
   a. said pin interconnecting said clevis and said hook body for free pivotal movement relative to each other,
5. said chain link being pivotally connected with said clevis body and precluded from separation therefrom so long as said clevis body and said hook body are pivotally interconnected.

4. The combination of claim 3 in which the size of said pivot pin is less than the size of said openings in said clevis legs so that said clevis is freely pivotal on said pin, and in which the size of said pin is slightly greater than the size of said opening in said boss so that said pin is non-rotatably fitted in said boss opening to prevent inadvertent separation of said pin from said boss.

* * * * *